(12) United States Patent
Eisenhuth

(10) Patent No.: US 8,048,489 B2
(45) Date of Patent: Nov. 1, 2011

(54) COMPOSITIONS COMPRISING BISCITRACONIMIDE, BISITACONIMIDE, AND/OR CITRACONIMIDO-ITACONIMIDE

(75) Inventor: Ludwig Eisenhuth, Obernburg (DE)

(73) Assignee: Lanxess Deutschland GmbH, Leverkusen (DE)

( * ) Notice: Subject to any disclaimer, the term of this patent is extended or adjusted under 35 U.S.C. 154(b) by 459 days.

(21) Appl. No.: 12/301,183

(22) PCT Filed: Apr. 26, 2007

(86) PCT No.: PCT/EP2007/054104
§ 371 (c)(1),
(2), (4) Date: Jan. 27, 2009

(87) PCT Pub. No.: WO2007/134948
PCT Pub. Date: Nov. 29, 2007

(65) Prior Publication Data
US 2009/0186158 A1    Jul. 23, 2009

Related U.S. Application Data

(60) Provisional application No. 60/810,656, filed on Jun. 5, 2006.

(30) Foreign Application Priority Data

May 18, 2006    (EP) .................................... 06114173

(51) Int. Cl.
B05D 3/02    (2006.01)

(52) U.S. Cl. .................. 427/384; 427/385.5; 427/389.9; 427/394

(58) Field of Classification Search ........................ None
See application file for complete search history.

(56) References Cited

U.S. PATENT DOCUMENTS

| 5,194,567 A | 3/1993 | Lewis |
| 5,230,666 A | 7/1993 | Lewis |

FOREIGN PATENT DOCUMENTS

| EP | 0 407 661 | 1/1991 |
| WO | WO 91/02013 | 2/1991 |

OTHER PUBLICATIONS

International Search Report and Written Opinion (8 pages), for PCT/EP2007/054104, Nov. 2, 2007.

*Primary Examiner* — Erma Cameron
(74) *Attorney, Agent, or Firm* — Brinks Hofer Gilson & Lione

(57) ABSTRACT

The invention pertains to a prepolymer composition comprising a mixture of monomers, oligomers, and polymers obtainable by polymerization of unsaturated monomers consisting of at least one of biscitraconimide, bisitaconimide, and citraconimido-itaconimide, and optionally (co)curable compound selected from bismaleimides, citraconamidomaieimides, and itaconamido maleimides, wherein 5-55 wt. % is monomer, 20-80 wt. % is oligomer having a molecular weight 300 to 3,000, and 10-50 wt. % is polymer having a molecular weight 3,000 to about 80,000, whereas the total content of monomers, oligomers, and polymers in the composition is at least 90 wt. %. The prepolymer can be used for making laminates and prepregs by curing the composition to a polymer.

11 Claims, No Drawings

COMPOSITIONS COMPRISING BISCITRACONIMIDE, BISITACONIMIDE, AND/OR CITRACONIMIDO-ITACONIMIDE

CROSS REFERENCE TO RELATED APPLICATION

This application claims priority to PCT/EP2007/054104 filed Apr. 26, 2007, European application 06114173.5 filed May 18, 2006 and U.S. Provisional application 60/810,656 filed Jun. 5, 2006, the entire contents of which are herein incorporated by reference.

FIELD

The invention relates to compositions comprising biscitraconimide, and to prepregs and laminates comprising these compositions.

BACKGROUND

In "The Synthesis of Bisitaconamic Acids and Isomeric Bisimide Monomers," Galanti, A. V. et al., Journ. Poly. Sci.: Polymer Chemistry Edition, Vol. 20, pp. 233-239 (1982) a method is disclosed for the preparation of biscitraconimides in the form of an isomeric mixture of the citraconic and itaconic imides.

In "The Development of Tough Bismaleimide Resins," Stenzenberger, H. D., et al., 31st International SAMPE Symposium, Vol 31, pp. 920-932 (1986) it is disclosed that bismaleimides are prime candidates for carbon fiber reinforced composites because of their properties. However, the article also points out that these materials tend to be brittle. Thus, several attempts have been made to improve the fracture toughness of the polymerized bismaleimides.

In "Bismaleimide Resins the Properties and Processing of 'Compimide' BMI Resins," Segal, C. L., et al., 17th Nat. SAMPE Conference 17, pp. 147-160 (1985) formulated bismaleimides are cured with the anionic catalysts DABCO and 2-methylimidazole. It was concluded that, in general, the curing of formulated bismaleimides improved the fracture toughness of the materials due to lower built-in cure stresses.

U.S. Pat. No. 4,568,733 issued on Feb. 4, 1986, relates to mixed aromatic bismaleimide/aromatic biscitraconimide resins which produce materials which have better handling, processing and thermal properties than materials with individual resins. These resins are thermally cured without a curing catalyst. However, the incorporation of the biscitraconimide into the bismaleimide generally produced a significant reduction in the elongation percent.

In EP 0407661 curable bisimide compositions are disclosed containing at least one biscitraconimide unit wherein the composition comprises an amount of an anionic curing catalyst to convert groups on the biscitraconimide units to alkylene bridges in the cured composition. In example 8 of this patent application a method is described for making a composition of biscitraconimide oligomers by radical polymerization. A mixture of n-hexamethylenebiscitraconimide, styrene, and dicumyl peroxide was polymerized and the composition thus obtained was used for the preparation of prepregs. It was, however, found that the viscosity of this composition was by far too low, so that it could not be used in commercial scale prepregging and laminating processes. Moreover, the reactivity of this prepolymer was low so that the gel time needed for the final curing process could not be reached.

Generally, the commercially used bismaleimide resins are all based on co-oligomers made from almost stoichiometric amounts of bismaleimides and co-monomers such as diamines, diallyl compounds, and require difficult processing conditions. In addition, the maleimide polymers are often brittle due to the high cross-link density obtained in the network polymers, whereas the maleimide oligomer of EP 0407661 has low flowing ability when applied onto fabric. The foregoing body of prior art reflects the need for bisimide resin systems which are easily processable, are made from almost solely a biscitraconimide monomer, and have lower cost.

SUMMARY

One objective of the present invention is to eliminate the foregoing drawbacks of the prior art bisimide resins and to substantially improve the processability of compositions made from biscitraconimide resins. For this purpose the present invention provides specific biscitraconimide compositions that can be further cured to higher polymers and are suitable for making prepregs, and which can also be used for making laminates.

One embodiment of the invention pertains to a prepolymer composition comprising a mixture of monomers, oligomers, and polymers obtainable by polymerization of unsaturated monomers consisting of at least one of biscitraconimide, bisitaconimide, and citraconimido-itaconimide, and optionally comprising a (co)curable compound selected from bismaleimides, citraconamido-maleimides, and itaconamido maleimides, wherein 5-55 wt. % is monomer, 20-80 wt. % is oligomer having a molecular weight 330 to 3,000, and 10-50 wt. % is polymer having a molecular weight 3,000 to about 80,000, and whereas the total content of monomers, oligomers, and polymers in the composition is at least 90 wt. %.

Further areas of applicability will become apparent from the description provided herein. It should be understood that the description and specific examples are intended for purposes of illustration only and are not intended to limit the scope of the present disclosure.

DETAILED DESCRIPTION AND EXAMPLES

The following description is merely exemplary in nature and is in no way intended to limit the present invention or its application or uses. The invention is illustrated below with the aid of an example:

For convenience, in this description the term "biscitraconimide" includes biscitraconimide, bisitaconimide, and/or citraconimido-itaconimide. Chemical structures of these compounds are illustrated below:

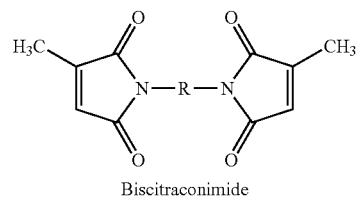

Biscitraconimide

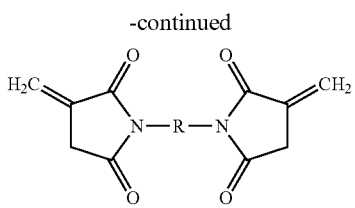

Bisitaconimide

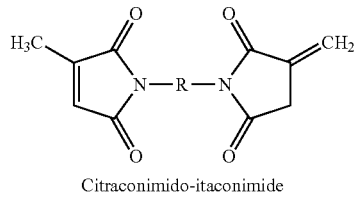

Citraconimido-itaconimide

Radical R in the above formulae is a divalent hydrocarbon moiety. Suitable hydrocarbon moieties include aromatic or aliphatic, cyclic or acyclic, substituted or unsubstituted, and linear or branched moieties. Preferably such moieties contain 1 to 25 carbon atoms, and optionally one or more heteroatoms selected as one from the group of O, N, and S.

More preferred are groups R selected from C1-20 alkylene, C6-C24 cycloalkylene, C6-C18 arylene, and C7-25 aralkylene. For example biscitraconimide, bisitaconimide, and/or citraconimido-itaconimide have groups R selected from tetramethylene; pentamethylene; hexamethylene; 2-methyl-pentamethylene; neopentylene; (2,2,4-trimethyl)hexamethylene; 1,3-bis-(methylene)cyclohexane; 4,4'-methylene-bis-2-methyl cyclohexane; 2,2-dicyclo-hexylpropylene, 4,4'-oxo-diphenylene, 4,4'-sulfono-diphenylene, 4,4'-thio-diphenylene, ethylene, dodecamethylene, oxybispropylene, 1,3-cyclohexylene, 3,3'-dimethyl-4, 4'-biphenylene, m-phenylene, p-phenylene, o-phenylene, 1,3-naphthylene, 1,4-naphthylene, 4,6-dimethyl-phenylene, 4-methyl-phenylene, 6-methyl-phenylene, 2-methyl-phenylene, 4,4'-methylene-diphenylene, and phenyl-methylene, o-xylylene, m-xylylene, and p-xylylene. The most preferred group R is m-xylylene.

Bismaleimides, citraconimido-maleimides, and itaconimido-maleimides have the following formulae, wherein group R has the same meaning as described above:

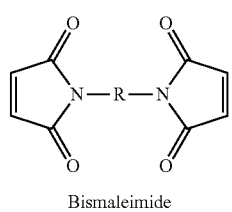

Bismaleimide

Citraconimido-maleimide

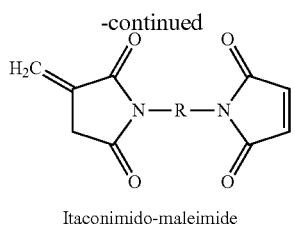

Itaconimido-maleimide

These prepolymeric compositions and the articles of manufacture produced therefrom offer several advantages over prior art bisimide formulations. For example, these bis-citraconimide-containing composition can easily be molded and the final polymeric materials thereof obtained can be processed at low temperatures and have excellent properties including a high Tg, good thermostability, and good mechanical properties, including the tensile strength, so that they are highly suitable for producing laminates e.g. for printed wire boards, or composites for thermal insulation, or special coatings e.g. on glass or metals.

Surprisingly, the compositions of this invention have a combination of properties which are not available in known biscitraconimide compositions. Thus the present compositions have high solubility in solvents such as gamma-butyrolactone and ketones, wherein these compositions have a solubility of up to 70% (weight/volume) at room temperature. Such solutions are furthermore stable for several days, more preferably for more than 2 weeks.

The solutions of these compositions preferably have appropriate viscosity to impregnate in fibers and fabrics, such as glass fabrics and the like, whereas after removal of the solvent the neat resin precursor prepolymer has a viscosity at 175° C. of at least 150 cP, so that it does not flow from the fiber or fabric during curing. Furthermore this prepolymer preferably has a reactivity, which results, optionally with the help of a catalyst, in a gel time of 2-5 minutes at 171° C.

The term "prepolymer" is used to indicate that the composition contains substantial amounts of oligomeric precursor in the MW (molecular weight) range of 330-3,000 atomic mass units. The composition also contains some higher oligomers, with a MW from 3,000-about 80,000. The term "about 80,000" means that minor amounts of this polymer can have somewhat higher molecular weight, i.e. up to 100,000 or even 120,000.

These higher oligomers are herein below called "polymers," which polymers should be not confused with the polymers having much higher MW that are formed after curing the prepolymer. This prepolymer can be further polymerized to crosslinked polymeric material having high molecular weight (higher than 80,000, usually much higher, i.e. 400,000 or more), which can be used for prepregs and laminates.

The prior art compositions do not meet these requirements, unless specific chemicals are added to the monomer to be incorporated in the prepolymer composition, such as bisamines ("Kerimid") or allylphenol compounds (e.g. diallyl bisphenol A). These additives either considerably add to the costs of these compositions or are carcinogenic and for that reason not admissible or acceptable. A further problem of these state of the art precursors is that they only can be used with solvents, such as DMF, NMP, or gamma-butyrolactone, which because of their toxicity can only be used under specific precautions.

In a preferred embodiment according to the invention the prepolymer compositions contains of 10-45 wt. % monomer, 30-60 wt. % oligomer (mw=330-3,000) and 15-40 wt. % polymer (mw=3,000-about 80,000). The preferred bisimide is m-xylylene biscitraconimide.

Biscitraconimides are known compounds and can be prepared by any of the methods disclosed in Dutch Patent Application No. 6,514,767; "The Synthesis of Biscitraconimides and Polybiscitraconimides", Galanti, A. V., and Scola, D. A., Journ, of Polym. Sci.: Polymer Chemistry Edition, Vol. 19, pp. 451-475 (1981); and "The Synthesis of Bisitaconamic Acids and Isomeric Bisimide Monomers", Galanti, A. V., et al., Journ. of Polym. Sci.: Polymer Chemistry Edition, Vol. 20, pp. 233-239 (1982), the disclosures of which are hereby incorporated by reference. Biscitraconimides are commercially available under the trade name Flexlink® (a mixture of m-xylylene biscitraconimide containing up to 10% of isomeric itaconimide groups), obtainable from Flexsys BV, the Netherlands.

The oligomeric mixture having the composition as described above can be made e.g. by simply heating up the biscitraconimide as a melt, or dissolved in the solvent which is desired for the prepreging process in the suitable concentration (30-70% imide w/v) at a temperature of 130 to 250° C., more preferably 150 to 220° C. Optionally, in the presence of a catalyst the biscitraconimide can be heated as a melt, or be dissolved in the solvent which is desired for the prepreging process in the suitable concentration (30-70% imide w/v) at a temperature of 130 to 220° C.

The oligomerization can also be carried out by heating a composition containing the biscitraconimide and one or more co-curable materials without any catalyst, to a temperature above the melting point of the biscitraconimide and maintaining the temperature at that level for a sufficient time to oligomerize the monomers into an oligomeric product. Generally, the oligomerization will be accomplished at a temperature in excess of 140° C. The oligomerization time will vary depending upon the amount of catalyst present and type of material being cured.

The co-curable materials are selected from bismaleimides, citraconimido maleimides, itaconamino maleimides, and aromatic amine, which may be present in an amount of up to 40% of the composition. The composition does not comprise other olefinically unsaturated monomers such as styrene.

Suitable catalysts are amines, e.g. trialkylamines or substituted imidazoles. Generally amounts of 0.2-1 wt. % are used. The reaction time depends on the solvent used and on the amount of solvent, but also on the amount of catalyst and the temperature, and also on the desired molecular weight distribution, which will determine the viscosity behavior during the final curing step.

It is preferable to select catalyst, the amount of catalyst, and the temperature so that a reaction time for the oligomerization of at least 1 hour is required to obtain the desired composition, in order to have good reaction control. The reaction can be controlled, e.g. by inline measurement of the viscosity, in such way that the reaction can be stopped as soon as the desired viscosity at the used temperature is reached. Another possibility is to take samples and analyze the oligomeric composition, e,g. by HPSEC technics.

The oligomeric mixtures as described can be further polymerized by adding anionic catalysts such as Dabco or DMAP, phosphines and optionally but not necessarily up to 2% of a co-agent such as triallylcyanurate (TAC), or bismaleimide can be used.

The anionic catalysts employed in anionic oligomerization for making the composition of the invention comprise generally known compounds which can be obtained commercially or can be prepared by known synthetic methods. In general the anionic catalyst must exhibit catalytic activity in the oligomerization of aliphatic biscitraconimide-containing compositions at suitable temperatures. Anionic catalysts within the scope of the present invention comprise imidazoles, substituted imidazoles, the alkali salts of organic alcohols, triphenylphosphine, trialkylphosphine, substituted or unsubstituted aliphatic and aromatic secondary and tertiary amines. The preferred catalysts for both economic and performance reasons are 2-phenylimidazole, 2-ethyl-4-methyl imidazole, and aliphatic amines.

The oligomeric product of the present invention is particularly useful for making fiber-reinforced composites and in coating applications because of the excellent thermal, electrical and mechanical properties. The novel composition is easily processable due to the good viscosity and solubility properties. It was also discovered that polymer castings made from the oligomeric mixtures according to the invention result in products with improved thermal and mechanical properties (improved glass temperature, improved bending strain), compared to polymers made directly from the corresponding monomer. Further, the polymerization can be accomplished without the use of solvents without the formation of volatiles thus allowing the fabrication of void-free oligomers.

For applications in the laminate field, it is necessary to make prepregs from the biscitraconimides in order to obtain the desired properties for the laminate. The impregnated fiber cloth must be tack-free, flexible and have the proper melt viscosity. The biscitraconimide monomers themselves are not suitable for these applications since they have a too low melt viscosity.

It is possible to make prepolymers having the desired properties which can be employed to make prepregs with the distinct advantage that these oligomers do not necessarily require a solvent in the prepreg manufacturing process. In the present commercial prepreg manufacturing methods, solvents must be employed which leads to costly solvent removal steps and some voids in the final product.

The invention will be further described with reference to the following examples which are not to be construed as limiting the scope of the invention.

EXAMPLE 1

A total of 600 grams of Flexlink® (m-xylene biscitraconimide containing up to 10% by weight of m-xylylene bisitaconimide, from Flexsys Holding BV, The Netherlands) was melted in a stirred glass reactor and heated up to 200° C. At this temperature 6 grams of phenylimidazole were added, and the viscosity of the liquid mixture was measured inline with a MARIMEX viscosimeter.

After 230 min the dynamic viscosity of the prepolymer was 70 cP at 200° C., and the reaction mixture was cooled down. (At 180° C. the viscosity of the mixture is 212 cp).

The product contained of 44 wt. % monomeric Flexlink, 33 wt. % oligomers having a MW ranging from 330 to 3,000, and 23% of polymers having a MW from 3,000 to about 80,000.

The product was completely soluble in solvents like gamma-butyrolactone, methylethylketone, cyclohexanone, acetone, NMP, DMF in concentrations up to 80% by weight and thus—after adding an appropriate curing catalyst—is excellently suitable for use to make prepregs, laminates and composites, or coatings.

EXAMPLE 2

The experiment is done as in example 1, but the melt was heated up to 180° C., and as oligomerization catalyst a mixture of 6 grams of phenylimidazole, and 1.5 grams of 2-ethyl-4-methylimidazole were added. After 8.5 hours the dynamic viscosity of the oligomeric mixture at 180° C. is 205 cp, The product contained 45 wt. % monomeric Flexlink®, 35 wt % oligomers in the m.w. range of 330-1500 and 19 wt. % polymers in the range of 3,000-about 80,000.

The molecular weight (MW) distribution was analyzed by HPSEC using an analytical column: PL-gel: 100 A, 600×7.5 mm ID, Dp=5 µm and THF as the mobile phase.

Evaluation was done via calibration line with polystyrene standards of known MW. The upper limit of about 80,000 has been evaluated by HPSEC with a second column (PL-gel 1000A, 300×7.5 nm).

EXAMPLE 3

A total of 70 grams of Flexlink® pastilles and 30 grams of gamma-butyrolactone (BLO), optionally in presence of a catalyst, were heated to the desired temperature under stirring in a glass flask; the mixture which was a homogeneous and clear solution in BLO (more or less viscous liquid) was analyzed by HPSEC technics.

The following results were obtained (solvent not considered):

| Catalyst (g) | Temp. (° C.) | Time (min) | Monomer % | Oligomer MW 330-3,000 % | Polymer MW 3,000-ca 80,000 % |
|---|---|---|---|---|---|
| — | 210 | 180 | 52 | 36 | 12 |
| PhI (0.35) | 210 | 120 | 20 | 55 | 25 |
| PhI (0.7) | 200 | 120 | 26 | 60 | 14 |
| PhI (0.7) | 190 | 240 | 22 | 57 | 21 |
| EMI (0.35) | 170 | 135 | 22 | 66 | 11 |

PhI = 2-phenylimidazole
EMI = 2-ethyl-4-methylimidazole

EXAMPLE 4

The prepolymerization with catalysts was also performed in a melt of 100 grams of Flexlink® 900 (biscitraconimide, ex Flexsys BV, The Netherlands) without solvent.

Higher temperatures and/or longer reaction times are needed to get the same conversions; the following results were obtained:

| Catalyst (g) | Temp. (° C.) | Time (min) | Monomer % | Oligomer MW 330-3,000 % | Polymer MW 3,000-ca. 80,000 % |
|---|---|---|---|---|---|
| PhI (0.5) | 200 | 225 | 45 | 29 | 26 |
| PhI (1) | 210 | 180 | 40 | 34 | 26 |
| EMI (1) | 180 | 140 | 46 | 44 | 10 |

The samples obtained were soluble in BLO or in MEK.

The results of Examples 1 and 2 show that prepolymerisation at lower temperature (e.g. in presence of more active catalyst, such as EMI) leads to mixtures with oligomers having lower molecular weight (MW). At higher temperature higher MW oligomers are formed.

This product is excellently soluble in the solvents mentioned above, and the solutions are stable for several months without change of the molecular weight distribution.

The product is excellently useful for making—after adding an appropriate curing catalyst—prepregs, laminates for high temperature stable composites, or coatings.

The foregoing description of various embodiments of the invention has been presented for purposes of illustration and description. It is not intended to be exhaustive or to limit the invention to the precise embodiments disclosed. Numerous modifications and variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A prepolymer composition comprising a mixture of monomers, oligomers, and polymers obtainable by polymerization of unsaturated monomers, the prepolymer composition comprising:
at least one selected from the group of biscitraconimide, bisitaconimide, and citraconimido-itaconimide,
wherein 5-55 wt. % is monomer, 20-80 wt. % is oligomer having a molecular weight 300 to 3,000, and 10-50 wt. % is polymer having a molecular weight 3,000 to about 80,000, and whereas the total content of monomers, oligomers, and polymers in the composition is at least 90 wt. %.

2. The composition of claim 1 further comprising a (co) curable compound selected as one from the group of bismaleimides, citraconamidomaleimides, and itaconamido maleimides.

3. The composition of claim 2 wherein the monomers, oligomers, and polymers are obtained from at least one of biscitraconimide, bisitaconimide, and citraconimido-itaconimide with the (co)curable compound selected from at least one of bismaleimides, citraconamido maleimides, and itaconamido maleimides.

4. The composition of 3 wherein the biscitraconimide, bisitaconimide, and citraconimido-itaconimide is at least one selected from the group of m-xylylene biscitraconimide, m-xylylene bisitaconimide, and m-xylylene citraconimido-itaconimide.

5. The composition of 3 wherein 10-45 wt. % is monomer, 30-60 wt. % is oligomer, and 15-40 wt. % is polymer.

6. A method for the manufacture of a prepreg, the method comprising:
impregnating fibers with the composition of claim 1; and
curing the impregnated fibers at elevated temperature.

7. A method for making a laminate, the method comprising:
impregnating fibers with the composition of claim 1; and
curing the impregnated fibers at elevated temperature to obtain a prepreg;
wherein the prepeg is used for making the laminate.

8. The method of claim 6, wherein the step of impregnating fibers uses a composition that further comprises a (co)curable compound selected as one from the group of bismaleimides, citraconamidomaleimides, and itaconamido maleimides.

9. The method of claim 8, wherein the step of impregnating fibers uses a composition where the biscitraconamide, bisitaconimide and citraconimido-itaconimide is at least one selected from the group of m-xylylene biscitraconimide, m-xylylene bisitaconimide, and m-xylylene citraconimido-itaconimide.

10. The method of claim 7, wherein the step of impregnating fibers uses a composition that further comprises a (co) curable compound selected as one from the group of bismaleimides, citraconamidomaleimides, and itaconamido maleimides.

11. The method of claim 10, wherein the step of impregnating fibers uses a composition where the biscitraconamide, bisitaconimide and citraconimido-itaconimide is at least one selected from the group of m-xylylene biscitraconimide, m-xylylene bisitaconimide, and m-xylylene citraconimido-itaconimide.

* * * * *